United States Patent
Mah et al.

(10) Patent No.: US 7,020,643 B2
(45) Date of Patent: Mar. 28, 2006

(54) METHOD AND SYSTEM FOR CLICKPATH FUNNEL ANALYSIS

(75) Inventors: Teresa Mah, Redmond, WA (US); Hendricus D. J. Hoek, Kirkland, WA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 607 days.

(21) Appl. No.: 10/056,766

(22) Filed: Jan. 25, 2002

(65) Prior Publication Data

US 2003/0154237 A1 Aug. 14, 2003

(51) Int. Cl.
*G06F 17/00* (2006.01)
*G06N 5/02* (2006.01)

(52) U.S. Cl. .............................. 706/46; 706/11; 706/12

(58) Field of Classification Search ................... 706/12, 706/11, 46; 707/3
See application file for complete search history.

(56) References Cited

U.S. PATENT DOCUMENTS

| | | | |
|---|---|---|---|
| 5,742,811 A | 4/1998 | Agrawal et al. | |
| 5,819,266 A | 10/1998 | Agrawal et al. | |
| 6,035,330 A | 3/2000 | Astiz et al. | |
| 6,199,034 B1 * | 3/2001 | Wical | 704/9 |
| 6,236,991 B1 * | 5/2001 | Frauenhofer et al. | 707/6 |
| 6,370,145 B1 * | 4/2002 | Dally et al. | 370/400 |
| 6,571,333 B1 * | 5/2003 | Jain et al. | 713/2 |
| 6,654,381 B1 * | 11/2003 | Dally et al. | 370/412 |
| 2002/0007373 A1 * | 1/2002 | Blair et al. | 707/505 |
| 2002/0083067 A1 * | 6/2002 | Tamayo et al. | 707/100 |
| 2002/0107699 A1 * | 8/2002 | Rivera et al. | 705/1 |
| 2002/0112048 A1 * | 8/2002 | Gruyer et al. | 709/224 |
| 2002/0136389 A1 * | 9/2002 | Fleischer et al. | 379/221.08 |
| 2002/0143558 A1 * | 10/2002 | Joseph | 705/1 |
| 2002/0147805 A1 | 10/2002 | Leshem et al. | |
| 2002/0169980 A1 * | 11/2002 | Brownell | 713/201 |
| 2003/0115191 A1 * | 6/2003 | Copperman et al. | 707/3 |
| 2003/0154237 A1 | 8/2003 | Mah et al. | |

OTHER PUBLICATIONS

Berendt, "Understanding Web Usage at Different Levels of Abstraction: Coarsening and Visualising Sequences," Humboldt University Berlin, Institute of Pedagogy and Informatics, 12 pages, Berlin, Germany.

Berkhin et al., "Interactive Path Analysis of Web Site Traffic," Proceedings of the Seventh ACM SIGKDD International Conference on Knowledge Discovery and Data Mining, 2001, pp. 414-419, ACM Press, New York, U.S.A.

Eick, "Visualizing Online Activity," Communications of the ACM, Aug. 2001, pp. 45-50, vol. 44, Issue 8, ACM Press, New York, U.S.A.

McEneaney, "Visualizing and Assessing Navigation in Hypertext," Conference on Hypertext and Hypermedia, Proceedings of the Tenth ACM Conference on Hypertext and Hypermedia: Returning to our Diverse Roots, 1999, pp. 61-70, ACM Press, New York, U.S.A.

Keim, "Visual Exploration of Large Data Sets," Communications of the ACM, Aug. 2001, pp. 38-44, vol. 44, Issue 8, ACM Press, New York, U.S.A.

(Continued)

*Primary Examiner*—Joseph P. Hiri
(74) *Attorney, Agent, or Firm*—Senniger Powers

(57) ABSTRACT

A system and method for extracting funnels from at least one input clickstream (CS) representing an ordered path of successively viewed web pages. The invention stores the CS in one or more tree structures in one scan, then traverses each tree structure to identify funnels satisfying input criteria, if any. The input criteria includes depth criteria, width criteria, starting page criteria, and end page criteria.

31 Claims, 8 Drawing Sheets

OTHER PUBLICATIONS

Derthick et al., "An Interactive Visual Query Environment for Exploring Data," Proceedings of the 10th Annual ACM Symposium on User Interface Software and Technology, pp. 189–198, 1997, ACM Press, New York, U.S.A.

Joshi et al., "Warehousing and Mining Web Logs," Proceedings of the Second International Workshop on Web Information and Data Management, 1999, pp. 63–68, ACM Press, New York, U.S.A.

Mah et al., "Funnel Report Mining for the MSN Network," Proceedings of the Seventh ACM SIGKDD International Conference on Knowledge Discovery and Data Mining, 2001, pp. 450–455, ACM Press, USA.

Srikant et al., "Mining Sequential Patterns: Generalizations and Performance Improvements," Proceedings of the Fifth International Conference on Extending Database Technology, Mar. 1996, 15 pages, USA.

Cadez et al., "Visualization of Navigation Patterns on a Web Site Using Model–Based Clustering," Proceedings of the Sixth ACM SIGKDD International Conference on Knowledge Discovery and Data Mining, 2000, pp. 280–284, ACM Press, USA.

Kato et al., "Navigation Analysis Tool Based on the Correlation Between Contents Distribution and Access Patterns," Proceedings of the Web Mining for E–Commerce Workshop (WEBKDD), Aug. 2000, 10 pages, USA.

Berendt, "Web Usage Mining, Site Semantics, and the Support of Navigation," Proceedings of the Web Mining for E–Commerce Workshop (WEBKDD), Aug. 2000, 11 pages, USA.

Gaul et al., "Mining Web Navigation Path Fragments," Proceedings of the Web Mining for E–Commerce Workshop (WEBKDD), Aug. 2000, Aug. 2000, 6 pages, USA.

Wu et al., "SpeedTracer: A Web Usage Mining And Analysis Tool," IBM Systems Journal 37(1), 1998, 13 pages, USA.

Srivastava et al., "Web Usage Mining: Discovery and Applications of Usage Patterns from Web Data," SIGKDD Explorations, vol. 1, Issue 2, 2000, pp. 12–23, USA.

Chi et al., "Using Information Scent to Model User Information Needs and Actions and the Web," Proceedings of the SIGCHI Conference on Human Factors in Computing Systems, 2001, pp. 490–497, ACM Press, USA.

Borges, "A Data Mining Model to Capture User Web Navigation Patterns," PhD Thesis, Department of Computer Science, University College London, Jul. 2000, 205 pages, England.

* cited by examiner

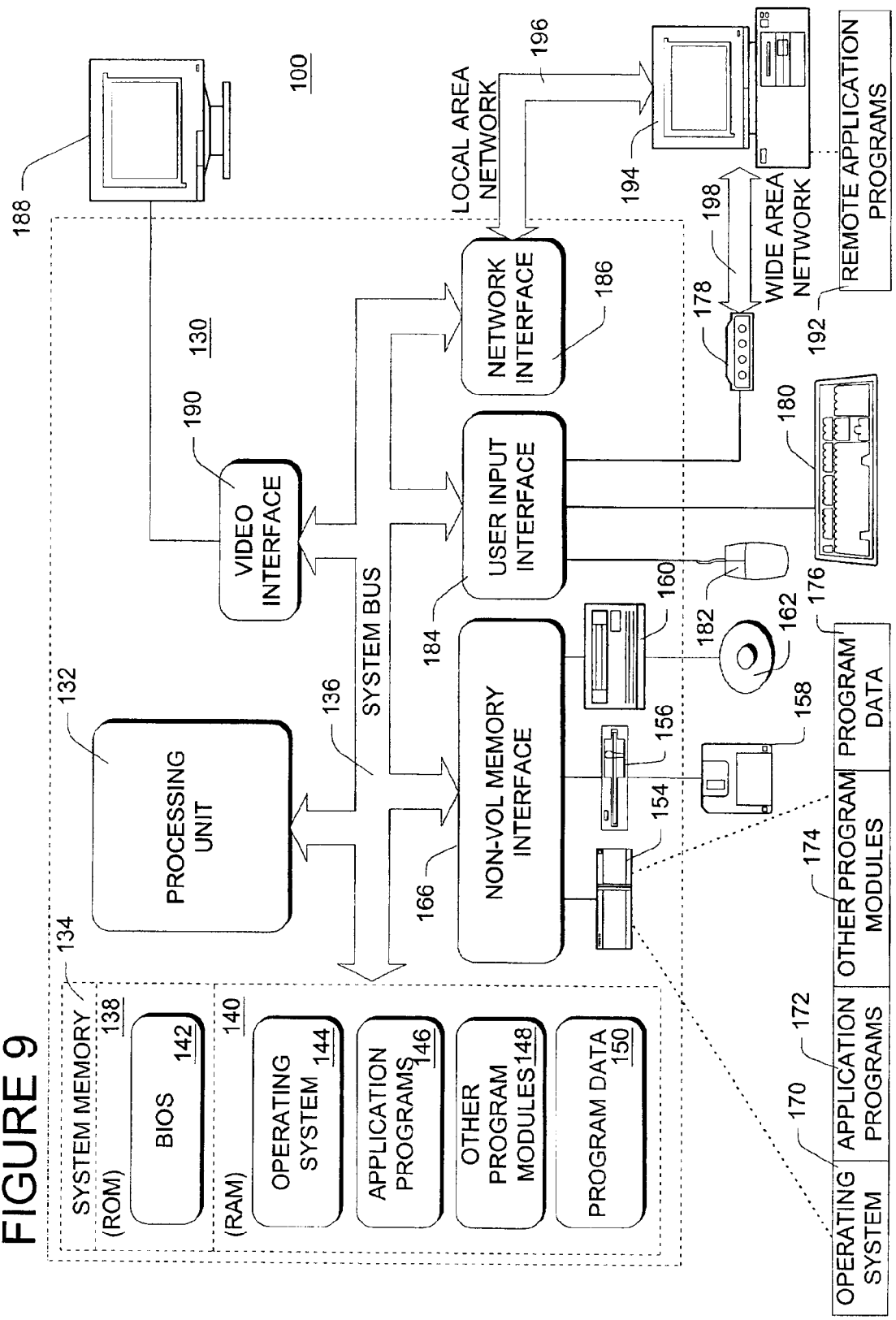

METHOD AND SYSTEM FOR CLICKPATH FUNNEL ANALYSIS

TECHNICAL FIELD

The present invention relates to the field of web usage data mining. In particular, this invention relates to generally extracting funnels of interest from input clickstreams.

BACKGROUND OF THE INVENTION

The prior art addresses a number of data mining problems such as classification, association discovery, sequential patterns, outlier detection, time series forecasting, and clustering. Data mining techniques have been applied to both market basket and web data. Application of data mining techniques to the web, i.e., web data mining, has followed three main directions: web content mining, web structure mining, and web usage mining. Generally, web usage mining is the process of applying data mining techniques to the discovery of usage patterns from web data. However, present web usage mining research does not address mining the retention behavior among a sequence of pages or sites.

For example, conventional data mining techniques fail to answer various questions regarding web usage mining or funneling: What percentages of hits on a web network home page are followed by hits on a specific web service site? What percentage of these hits is followed by hits on a specific web service site and then followed by hits on another specific web service site? What are the most interesting clickpath funnels starting with these hits? Where does the greatest drop off rate occur after a user has hit the web network home page?

In addition, presently available data mining techniques are unable to define any measure of "interestingness" with regard to funnels. Instead of relaying specific funnel points (pages) of interest at each step, a business manager may want to know all "interesting" funnels starting with given funnel points. For example, for users who access a portal home page, what is the most common behavior after reading the page? Where do users begin to leave the site? When do users abandon the network? These all translate into the questions: What are the widest funnels? What are the narrowest funnels? What are the funnel points? In these cases, when attempting to determine funnel drop off rates, funnel points are not provided. Instead, conventional data mining cannot provide an analysis yielding the most interesting funnels.

For these reasons, a system for clickpath funnel analysis is desired to address one or more of these and other disadvantages.

SUMMARY OF THE INVENTION

The invention is directed to extracting funnels from at least one input clickstream (CS) representing an ordered path of successively viewed web pages. In particular, the invention stores the CS in one or more tree structures in one scan, then traverses each tree structure to identify funnels satisfying input criteria. That is, the invention runs all subpaths in the input CS with different starting points through trees to generate interesting funnels.

The invention performs a funnel analysis without requiring knowledge of any intermediate steps, start points, or end points as input. With the clickstream as the input, the invention determines which steps or paths are funneled. The invention consumes a modest amount of memory, and derives information for any start or end point. The invention stores the clickpaths in only one scan of the input CS.

According to one aspect of the invention, a method extracts at least one funnel from at least one input clickstream (CS). The CS represents an ordered path of web pages $P_1$ to $P_N$ successively viewed by a user. The method includes storing each ordered path within the CS in one of up to N tree structures. Each of the tree structures has a root node $P_i$ corresponding to one of pages $P_1$ to $P_N$ and has successive child nodes corresponding to the successive pages after $P_i$ of $P_{i+1}$ to $P_{i+X}$. In this instance, X represents a depth criterion specified by the user. The method also includes extracting a list of stored paths from each tree structure from the root node $P_i$ to each end node to represent a set of funnels corresponding to the CS.

According to another aspect of the invention, a method analyzes funnels in at least one input CS. The method includes storing one or more paths within the CS satisfying a first input criterion in one or more tree structures. The method also includes analyzing each tree structure to identify any of the paths that satisfy a second input criterion. The second input criterion represents a width criterion.

According to yet another aspect of the invention, a method extracts at least one funnel from one or more input clickstreams. Each of the clickstreams represents an ordered path of web pages successively viewed by a user. The method includes creating a tree structure for storing the ordered path for each of the clickstreams. Each tree structure has a root node corresponding to the first page of the clickstream and a child node corresponding to each of the successive pages in the clickstream. For each input starting page, the method includes searching each tree structure to identify any stored path that starts at a node associated with the input starting page and satisfies an input depth requirement. The input depth requirement represents a desired number of pages in each path. The method also stores each identified path in a temporary tree. The method also includes recursing through the temporary tree to identify any path that satisfies an input width requirement. The input width requirement represents a retention rate.

Briefly described, a computer-readable medium embodying aspects of the invention has computer-executable components for extracting at least one funnel from at least one input clickstream (CS) representing an ordered path of successively viewed pages $P_1$ to $P_N$ of a user. The components include a repository component, a support component, a funnel component, and a criteria component. The repository component stores each ordered path within the CS in one of up to N tree structures. Each of the tree structures has a root node $P_i$ corresponding to one of pages $P_1$ to $P_N$ and has successive child nodes corresponding to the successive pages after $P_i$ of $P_{i+1}$ to $P_{i+X}$. The value X represents a depth criterion. The support component increments a counter associated with each node in each ordered path as the ordered path is stored. The funnel component extracts a list of stored paths from each tree structure from the root node $P_i$ to each end node to represent a set of funnels corresponding to the CS. The criteria component analyzes each stored path in each tree structure using the counters to identify the stored paths that satisfy one or more input criteria.

Another aspect of the invention is directed to a computer-readable medium storing a data structure for a particular node in a tree structure. The data structure stores at least one click path from one or more input clickstreams representing an ordered path of successively viewed web pages $P_1$ to $P_N$ of a user. The tree structure has a root node. Each particular node is associated with one of the viewed web pages. The data structure includes a first field storing a page name representing a name of the viewed web page associated with the particular node. The data structure also includes a second field storing a support value representing a frequency of appearance for a particular path starting with the root node of the tree structure and including the particular node.

According to yet another aspect of the invention, a method extracts at least one funnel from at least one input clickstream (CS) representing an ordered path of successively viewed pages $P_1$ to $P_N$. The method includes reading through CS from $P_1$ to $P_X$. In this instance, X is less than or equal to N and represents an input depth. The method also includes creating a first tree with a root node associated with page $P_1$, and with successive child nodes associated with pages $P_2$ to $P_X$. The $P_X$ represents a child node with parent $P_{X-1}$. The method also includes incrementing a counter associated with each node in the first tree as the node is created, creating a second tree with a root node associated with page $P_2$ and with successive child nodes associated with pages $P_3$ to $P_{X+1}$, incrementing a counter associated with each node in the second tree as the node is created, creating additional trees rooted at each page $P_{N-X+2}$ to $P_N$ for all subpaths in CS starting with pages $P_{N-X+2}$ to $P_N$, storing the subpaths that start at each page and end at $P_N$ in the respective tree so that new trees are created only when the trees or nodes have not already been created, and running through all paths in each tree to extract and output only paths that satisfy input depth and input width criteria.

Alternatively, the invention may comprise various other methods and apparatuses.

Other features will be in part apparent and in part pointed out hereinafter.

BRIEF DESCRIPTION OF THE DRAWINGS

FIG. 9 is a block diagram of one embodiment of the invention illustrating one example of a suitable computing system environment on which the invention may be implemented.

Corresponding reference characters indicate corresponding parts throughout the drawings.

BRIEF DESCRIPTION OF THE APPENDIX

Appendix A includes an exemplary funnel analysis reports generated by the invention.

DETAILED DESCRIPTION OF THE INVENTION

The invention includes a framework and analysis for a type of web usage mining called funnel analysis or funnel report mining. In general, a clickpath funnel report is a study of the clickpath and retention behavior among a series of web pages or web sites. Clickpath funnel reports are particularly useful in e-business because they help analyze the usability and structure of a web site.

Funnel analysis relates to data mining and automated knowledge extraction. Customers are analysts such as business managers, product planners of sites, or anyone interested in retention of users for sign-up or registration processes in their sites. Businesses can analyze site usability by evaluating on-line sign-up processes. As a result, businesses can re-negotiate deals with content providers or re-design their sites. The invention generates funnel reports at a web service level and/or at a web page level.

For example, funnel reports provide a measure of how well an on-line sign-up process works. Suppose a site has three specific steps (pages) in its sign-up process. An analyst may wish to know the number of users who hit the first page of the sign-up process, how many then proceeded to the second step and, finally, the number that ended up at the last page and successfully subscribed to the service. The end result of this analysis is a picture of a funnel where the width at the top of the funnel represents all of the users who had been to the first step of the sign-up process. The width in the middle of the funnel represents the number of users who had seen both the first and second pages of the sign-up process, and the bottom of the funnel reveals the number of users who ended up at the last page and finally subscribed to the service. The width is referred to as the retention rate or the drop-off rate depending on the analyst's perspective. Wide funnels are those areas of the site/clickpaths with the greatest retention rates; narrow funnels are those areas of the site/clickpaths with greatest drop-off rates. A significant drop-off rate between one step and the next may indicate that the site should restructure its sign-up process to increase retention. Different Internet properties and services can produce extremely different funnel shapes. Empirical data shows that drop-off rates between funnel steps can be as high as 98% or as low as 2%.

Figure 3A:
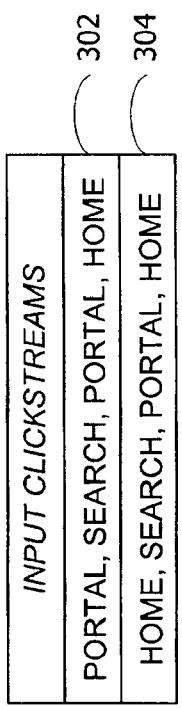
FIG. 3A is a block diagram of one embodiment of the invention illustrating an example of a clickstream file.
Figure 3B:
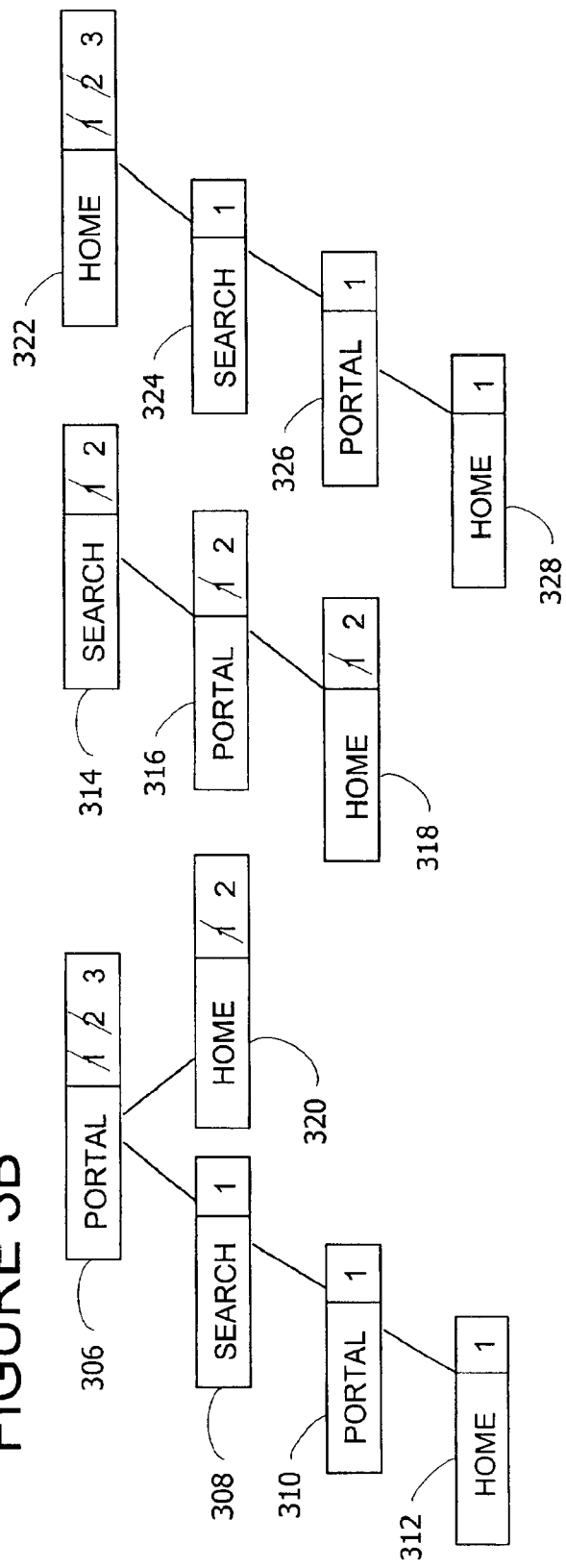
FIG. 3B is a block diagram of one embodiment of the invention illustrating tree generation for the example clickstream file of FIG. 3A.
Figure 5:
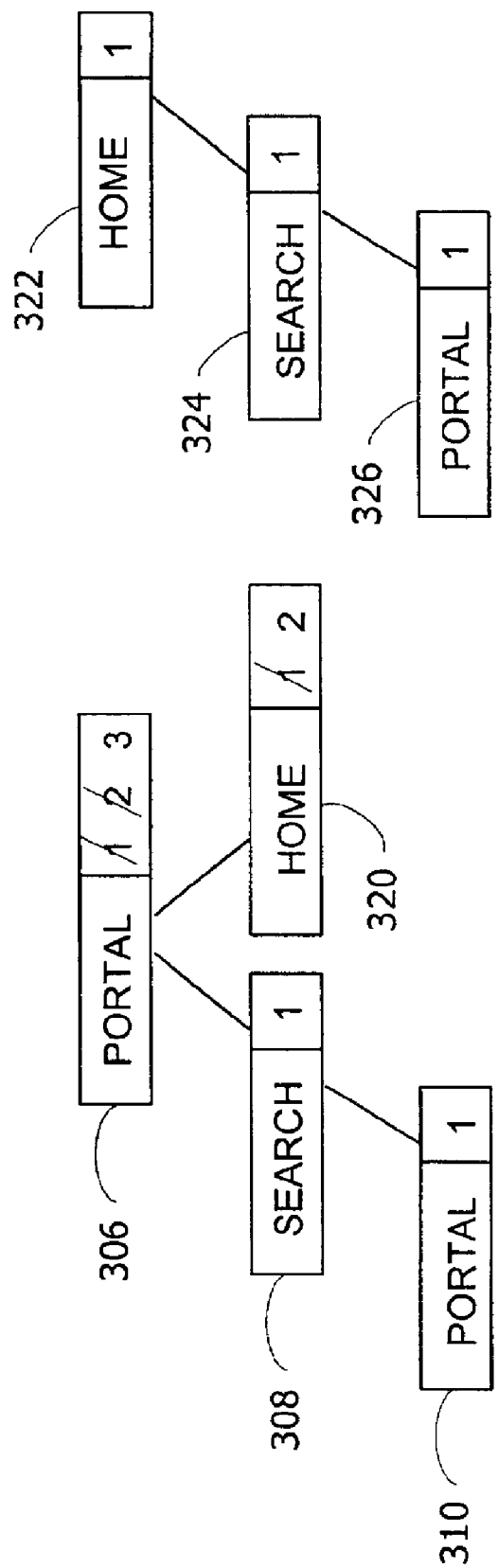
FIG. 5 is a block diagram of one embodiment of the invention illustrating width and depth criteria validation of the sample clickstreams of FIG. 3A.
Figure 6:
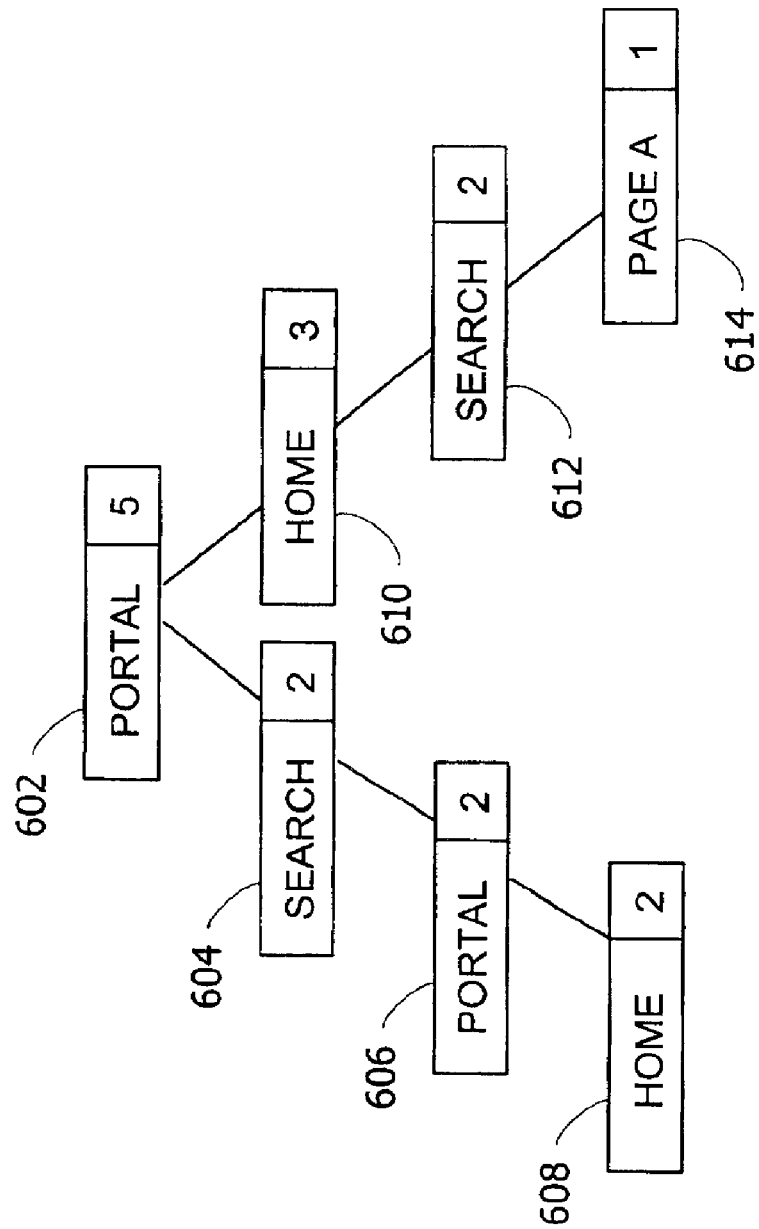
FIG. 6 is a block diagram of one embodiment of the invention illustrating trees and counters created after scanning sample clickstreams.

Generally, the invention stores an input clickstream having an ordered path of successively viewed web pages in one or more tree structures (see FIGS. 3B, 5 and 6). The tree structures have a root node corresponding to one of the pages in the input clickstream, and successive child nodes corresponding to the successively accessed web pages in the input clickstream. During the tree generation phase, each path in a tree represents all of the clickpaths found (up to the maximum depth) that begin with the page at the root of the tree. In one embodiment, the invention creates a tree for each starting page. A counter at each node in the trees stores the number of sessionized clickstreams that include the subpath that ends at each node. The invention includes, but is not limited to, two methods for storing the clickstream as tree structures (see FA-SPNAV and FA-FPNAV described below).

Figure 1:
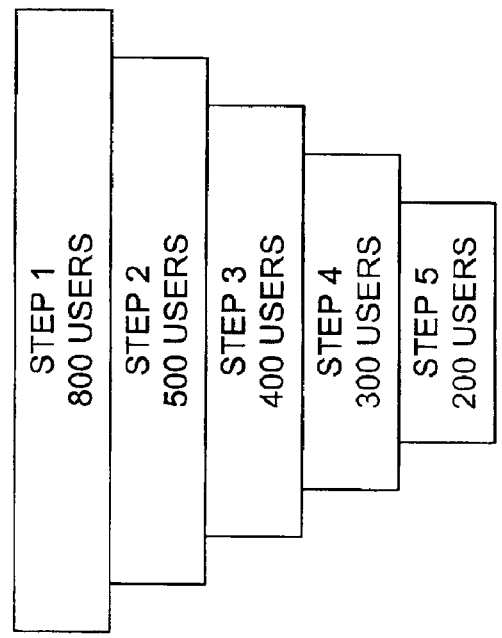
FIG. 1 is a block diagram of one embodiment of the invention illustrating a sample funnel.

FIG. 1 shows a sample funnel with five steps in a subscription process. In this example, 800 users hit step 1. Of those 800, 500 of them hit step 2 after viewing step 1.

FIG. 1 further shows that 400 users performed the first three steps, 300 performed the first four steps, and only 200 finished all five steps. In effect, 25% of users who hit step 1 reached the last step of the funnel.

The invention finds the funnel slope (drop-off rates) for a set of required funnel points in clickstream data. That is, when given the actual steps themselves, a scan of the entire data set once to look for and count sequences of the steps in the clickstream reveals the funnels. This example itself is not a data mining application per se.

Funnel reports generally lead to re-negotiation of deals with content providers to better reflect the worth of the site content or re-design of the sites to better meet the likes and dislikes of end users. In the case of deal re-negotiations, when certain types of content generate a high rate of abandonment, the deal is either canceled or the link to the content is not given dominant promotion locations in the network. When re-designing sites to better meet users' interests, product managers may decide to add extra categories of content, placing pages that were previously unknown to be significant into the new content areas. To re-design the sites taking into account users' dislikes, designers may decide to cut certain steps of sign-up processes that appear to prevent end users from finishing all the steps required.

The present invention provides measures of interestingness to determine whether a funnel is "interesting." This can be achieved through depth and width criteria. The depth of a funnel is the number of levels (funnel steps) in the funnel. Interesting funnels can be specified as having exactly X levels or less than or equal to X levels. For example, a funnel with the points A, B, C, D, E has a depth of five. With this invention, the definition of interestingness is the slope of the funnel.

Figure 2:
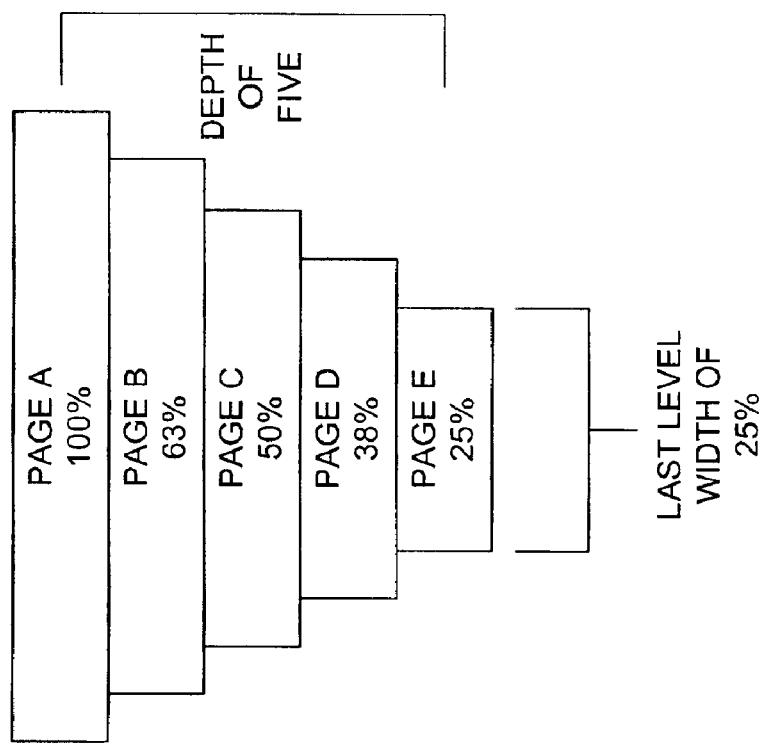
FIG. 2 is a block diagram of one embodiment of the invention illustrating widths associated with the funnel of FIG. 1.

Width criteria refer to each step in the funnel. The width of a point can be measured in terms of both absolute and relative frequency. The width of a funnel point, measured relatively, is the frequency of the full path ending at that point in the funnel divided by the frequency of the first (top) page of the funnel. For example, the funnel A, B, C, D, E in FIG. 2 with respective values 200, 126, 100, 76, 50, has widths of 100% at level 1, 63% at level 2, 50% at level 3, 38% at level 4, and 25% at level 5. The absolute frequencies are 200, 126, 100, 76, and 50. The invention can specify a width criterion at each level of the funnels of interest. Another way to specify width is to look at only the last level's width. Requiring that the last level width of interesting funnels be of a certain size (e.g., less than or equal to 10%) would imply narrower funnels. A last level width criterion of greater than or equal to 60%, for example, may indicate interest in wider funnels. For simplicity, width generally refers to last level relative width.

Similar to width criteria, depth criteria can be specified in terms of maximum, minimum, absolute, or relative criteria. However, in one embodiment, only maximum depth criteria and absolute depth criteria are used to optimize tree generation (i.e., to reduce analysis time and limit the amount of memory used to store the trees by reducing the number of trees and nodes). Minimum depth criteria are analyzed along with width criteria after the trees have been generated.

Using criteria such as these, the clickpath funnel analysis framework of the present invention involves, for a set of users' clickstreams, reporting all funnels with minimum or maximum width X at each level and maximum depth Y. This is the funnel analysis framework in its most general sense. However, site managers are usually not interested in funnels starting with all possible pages; they are only interested in funnels starting with a specific set of pages. This type of criterion may be referred to as a starting page criterion. In these cases, further refinements include, for a set of users' clickstreams, reporting all funnels starting with pages (P1, P2, P3, . . . ,Pn) having minimum or maximum width X at each level and maximum depth Y.

The following sections describe exemplary solutions to the funnel analysis problem. In one embodiment, each of the methods described herein is stored as a set of computer-executable instructions on one or more computer readable media.

Funnel Analysis Sub Path NAVigation (FA-SPNAV)

The FA-SPNAV solution and the FA-FPNAV solution (see below) are described in a tree-based environment, and employ a single scan of the data file. The idea behind the solutions is to store all subpaths or full paths of each user's clickstream satisfying the depth and starting page criteria in tree structures, and then read through the trees to find funnels satisfying the width requirements. The analysis works by creating a tree for each top funnel point, and then creating branches under the trees for each subpath or full path that begins with the top point. Each path in a tree represents all the click paths found that start with the page at the root of the tree. Counters at each node in a tree keep track of how many sessionized clickstreams contain the subpath that ended in that node.

In general, SPNAV analyzes funnels in at least one input clickstream (CS). The method includes storing one or more paths within the CS satisfying a first input criterion in one or more tree structures. The method also includes analyzing each tree structures to identify any of the paths that satisfy a second input criterion. The second input criterion represents a width criterion, for example.

The SPNAV solution extracts at least one funnel from at least one input clickstream (CS). The CS represents an ordered path of web pages $P_1$ to $P_N$ successively viewed by a user. The method includes storing each ordered path within the CS in one of up to N tree structures. Each of the tree structures has a root node $P_i$ corresponding to one of pages $P_1$ to $P_N$ and has successive child nodes corresponding to the successive pages after $P_i$ of $P_{i+1}$ to $P_{i+X}$. In this instance, X represents a depth criterion specified by an analyst. For example, the depth criterion represents a desired number of pages in each stored path. As the paths or subpaths are stored, SPNAV increments a counter associated with each node in each ordered path. The method also includes extracting a list of stored paths from each tree structure from the root node $P_i$ to each end node to represent a set of funnels corresponding to the CS. SPNAV also automatically generates a report of the extracted list of stored paths.

SPNAV analyzes each stored path in each tree structure using the counters to identify the stored paths that satisfy selected input criteria. In addition to the depth criterion described above, the input criteria includes, but is not limited to, a width criterion, a starting page criterion, and an end page criterion. The width criterion represents a retention rate. For example, the width criterion specifies a minimum width or a maximum width or both. The starting page criterion specifics a set of pages in CS from which $P_i$ is selected. The end page criterion specifies a set of pages in CS that can serve as end nodes in each tree structure.

FIG. 3A illustrates a sample clickstream file named D. Each row in D contains the clickstream data for a user-session. Clickstream data is a sequence of hits, such as a first clickstream 302 of portal/search/portal/home. This clickstream 302 represents a user-session where the user hit a portal web page first, proceeded on to a search web page, returned to the portal page, and then accessed a specific home page.

One analysis, called FA-SPNAV for Sub Path NAVigation, starts by looking at the first clickstream record $CS_1$. $CS_1$ contains page views $P_1, P_2, \ldots, P_X, \ldots, P_N$, where N is the number of pages viewed in the record. $P_1, P_2, \ldots, P_N$ represent the first, second, ..., X, ..., and last pages in the clickstream of the user-session. The invention stores unique click paths in branches of tree structures, where each node in a tree has a page name and a support value. The name field is the name of the page contained in the node and the support is the number of times the particular subpath (beginning at the root and ending at the node in question) has appeared in the data file. FIG. 3B, described in detail below, illustrates tree generation from the clickstreams of FIG. 3A.

Figure 4:
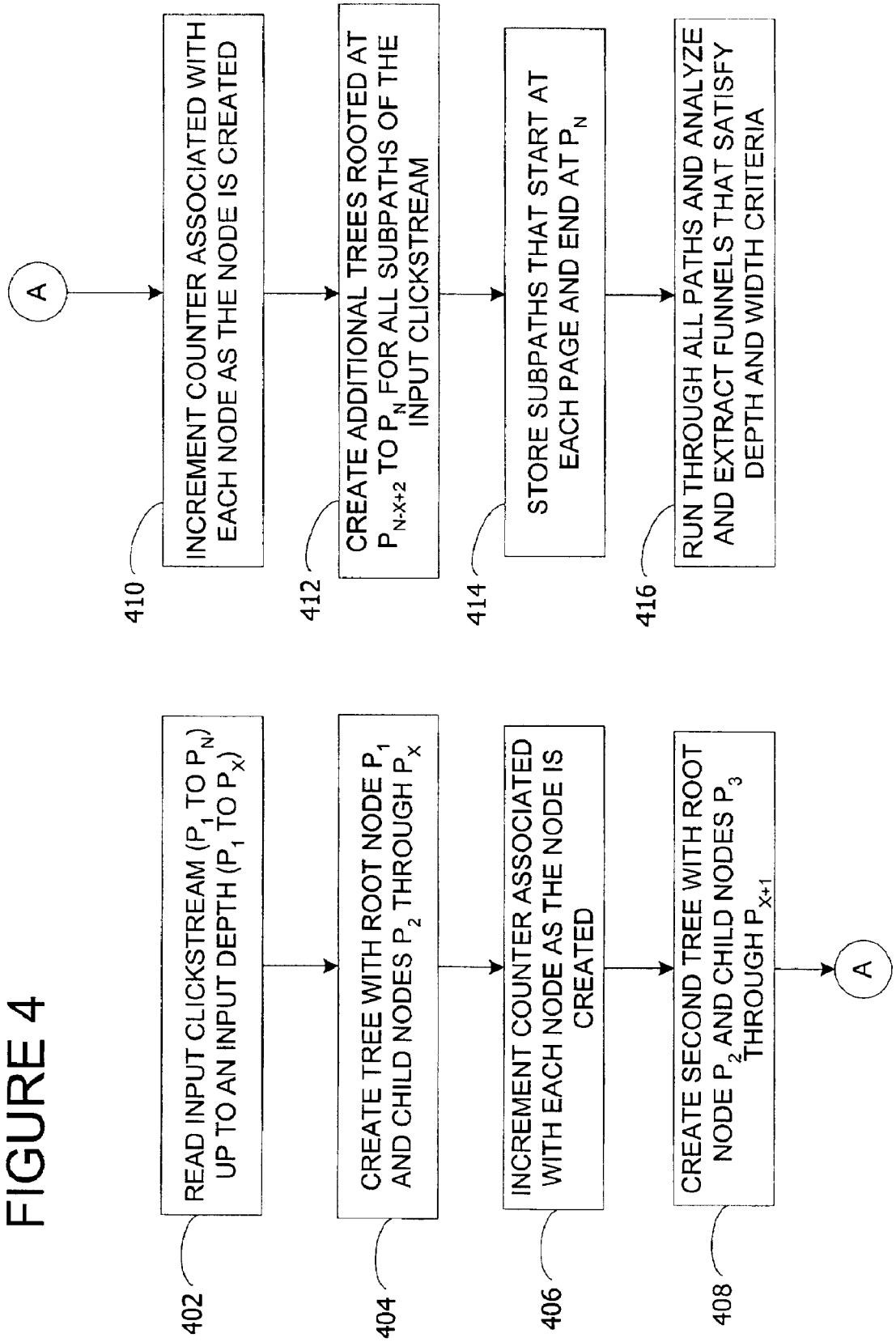
FIG. 4 is an exemplary flow chart illustrating operation of the SPNAV funnel analysis.

Referring now to FIG. 4, given the criteria that the funnels of interest are those funnels with depth equal to X or less than X, the invention reads through $CS_1$ at 402 starting with $P_1$ up to $P_X$. The invention creates a tree at 404 with root node containing the page $P_1$, and descendant nodes consisting of $P_2 \ldots P_X$ where $P_2$ is the child node of $P_1$, $P_3$ is the child node of $P_2$, and $P_X$ is the leaf node with parent $P_{X-1}$. As these are created, the invention also increments each node's support by one at 406. In essence, the support counter indicates the number of times the subpath ending at that node and beginning with the root node in the tree has appeared. If X is greater than N, then the invention only runs each subpath down to $P_N$. To extract funnels that reveal network abandonment behavior (i.e., after users hit a specified page, 9% of the time they abandon the network on the next click), the invention treats the end of a clickstream as a "page," thereby increasing N by 1.

After the invention finishes incrementing the counters for the tree rooted at $P_1$, the invention then proceeds to the subpath of $CS_1$ starting with $P_2$ and ending at $P_{X+1}$. The invention creates at 408 a new tree rooted at $P_2$, increments the node's support at 410, creates the descendent nodes and increments all their supports. The invention is finished with the clickstream $CS_1$ when trees have been created for each X-item subpath of $CS_1$ starting with $P_1, P_2, \ldots, P_{N-X+1}$. For the subpaths starting with $P_{N-X+2} \ldots P_N$, the invention creates trees at 412 rooted at each page $P_{N-X+2}, \ldots, P_N$ and then stores at 414 the subpaths that start at each page (and ending at $P_N$) in the respective tree. The invention only creates nodes and new trees when they are not already present. By the end of the processing of $CS_1$, N trees should exist where each tree gives all the subpaths beginning with the node at the root of the tree. The invention processes the next clickstream $CS_2$ in a similar manner; after a node has been created or if it is already present, the invention increments its support counter. If there are starting page criteria on the funnels, then only create a tree for a page $P_i$ when $P_i$ is one of the starting pages entered by the user. In this case, only S trees would exist if S was the number of starting pages inputted.

After processing the entire clickstream data set, a number of trees exist, where each tree represents all funnels with a particular starting page. The analysis then proceeds to the second phase where it runs through all branches of each tree at 416, extracting and outputting only branches that satisfy the depth and width criteria. For example, a branch with nodes in the order {Page B, Page K, Page A} and counters {20, 10, 5} represents the funnel {Page B, Page K, Page A}. The funnel values indicate that 20 clickstreams (user-sessions) in the data file contained a hit on Page B. Half of the user-sessions that saw Page B hit Page K immediately afterwards, and 25% of user-sessions that hit Page B had Page K and Page A as their second and third page views. If the last level width criterion was set to "greater than or equal to 23%", then this funnel would satisfy the requirements. If the last level width criterion was set to "greater than or equal to 30%" or "less than 20%", then this funnel would not be valid. If width criteria had been entered for each level, the analysis will check the validity of the width at each level. In this case, if a node $Node_i$ at any one level does not satisfy the width criteria at that level, then the analysis ceases to read all nodes under $Node_i$.

In some cases, an absolute frequency width criterion might be more appropriate. For example, if the funnels of interest are those funnels starting with Page A, and the invention knows that the number of hits on Page A completely dominates the number of hits on Page B, then it may be more suitable to specify an absolute frequency width criterion such as "funnel point 2 greater than or equal to 10000 hits" rather than a relative frequency criterion. Another interesting alternative is to take into consideration the number of outgoing branches on a node at any one level. A user can specify width criteria relative to aggregate measures, for example, where the user requires that the absolute or relative widths of an "interesting funnel" be greater or less than the average width across all its adjacent nodes.

The SPNAV analysis is very efficient in the sense that it reads the data file only once. Regarding memory, for a clickstream file containing P different pages and given a depth criterion of less than or equal to D, the invention needs a maximum of $P^D + P^{D-1} + \ldots + P$ nodes to hold all the trees in memory. However, in reality, the actual number of nodes used is much less. This maximum only holds if users have clickstreams containing every possible combination of pages, which is never the case. In a majority of situations, analysts only want to see funnels with smaller depth to get to the root of the underlying business problem. Therefore, D is usually quite small. Past experience indicates that site managers are not always interested in pages that get low numbers of hits; analyzing only pages that are hit most frequently by users usually reduces P, the number of different pages in the clickstream file. In addition, the number of trees created is diminished drastically when starting page criteria are specified. For S different starting page criteria, the number of trees created is essentially reduced by P–S. For example, if the clickstream file was composed of 1000 different unique pages and the site was only interested in funnels starting with ten specific pages, the invention creates 10 trees rather than 1000.

As discussed above, FIG. 3A illustrates two sample input clickstreams. In this example, the full path of the first clickstream 302 is portal/search/portal/home, and the full path of the second clickstream 304 is home/search/portal/home. FIG. 3B illustrates tree generation for the two sample input clickstreams 302, 304 of FIG. 3A under FA-SPNAV analysis. No depth or starting page criteria have been specified. In FIG. 3B, a tree includes portal 306 as the root node, and successive child nodes search 308, portal 310, and home 312. Another tree includes the subpath of the first clickstream 302: search 314 (as the root node), portal 316, and home 318. The first tree includes a child node home 320 connected to the root node portal 306 representing another subpath of the first input clickstream 302. A third tree includes the second clickstream 304 having a root node home 322 and successive child nodes search 324, portal 326, and home 328.

The counters associated with a particular node indicate the number of full paths or subpaths from either clickstream 302, 304 that include the particular node. A new node has a counter value of 1. For example, the counter associated with the root node portal 306 has been incremented to 1 as the full path of the first input clickstream 302 is scanned and then to 2 as the subpath portal 306/home 320 of the first input clickstream 302 is scanned and then to 3 as the subpath portal 306/home 320 of the second input clickstream 304 is scanned.

FIG. 5 illustrates width and depth criteria validation of the sample clickstreams 302, 304 of FIG. 3A. In this example, the depth criteria includes "less than or equal to three" and the starting page criteria specifies portal or home. Each tree has no more than three nodes because of the depth criteria, and only the portal or home pages can be root nodes in a tree. As such, one tree has portal 306 as the root node and search 308 and portal 310 as successive child nodes. The tree also includes home 320 as a child node of portal 306. A second tree has home 322 as a root node with search 324 and portal 326 as successive child nodes.

FIG. 6 shows a set of trees and respective counters created via the FA-SPNAV analysis. The tree includes portal 602 as the root node, and search 604, portal 606, and home 608 as successive child nodes. In another branch, home 610, search 612, and Page A 614 are successive child nodes of root node portal 602.

With the depth criteria specifying that the depth can be no less than three and no more than four and the width criteria specifying greater than or equal to 30% (i.e., having a retention rate relative to the first level of greater than or equal to 30% at each level), the following valid funnels are identified: portal 602, search 604, portal 606 (100%, 40%, 40%); portal 602, search 604, portal 606, home 608 (100%, 40%, 40%, 40%); and portal 602, home 610, search 612 (100%, 60%, 40%). Alternatively, with depth criteria of less than or equal to three and width criteria of less than or equal to 50%, the following valid funnels are identified: portal 602, search 604 (100%, 40%); and portal 602, search 604, portal 606 (100%, 40%, 40%).

See Appendix A for an exemplary report generated after an FA-SPNAV analysis on sample data.

The following section describes another exemplary solution to the funnel analysis problem.

Funnel Analysis—Full Path NAVigation (FA-FPNAV)

With the FA-SPNAV analysis, the invention reads through every X-item subpath of each clickstream record in the data file (where X represents the maximum depth). This limits the number of nodes built down each tree. Starting page criteria limits the number of actual trees created. In the rare case when an analyst does not want to apply any starting page criteria and needs to extract very deep funnels, the analyst can apply another tree building method such as FA-FPNAV that will store fewer nodes than FA-SPNAV.

Figure 7:
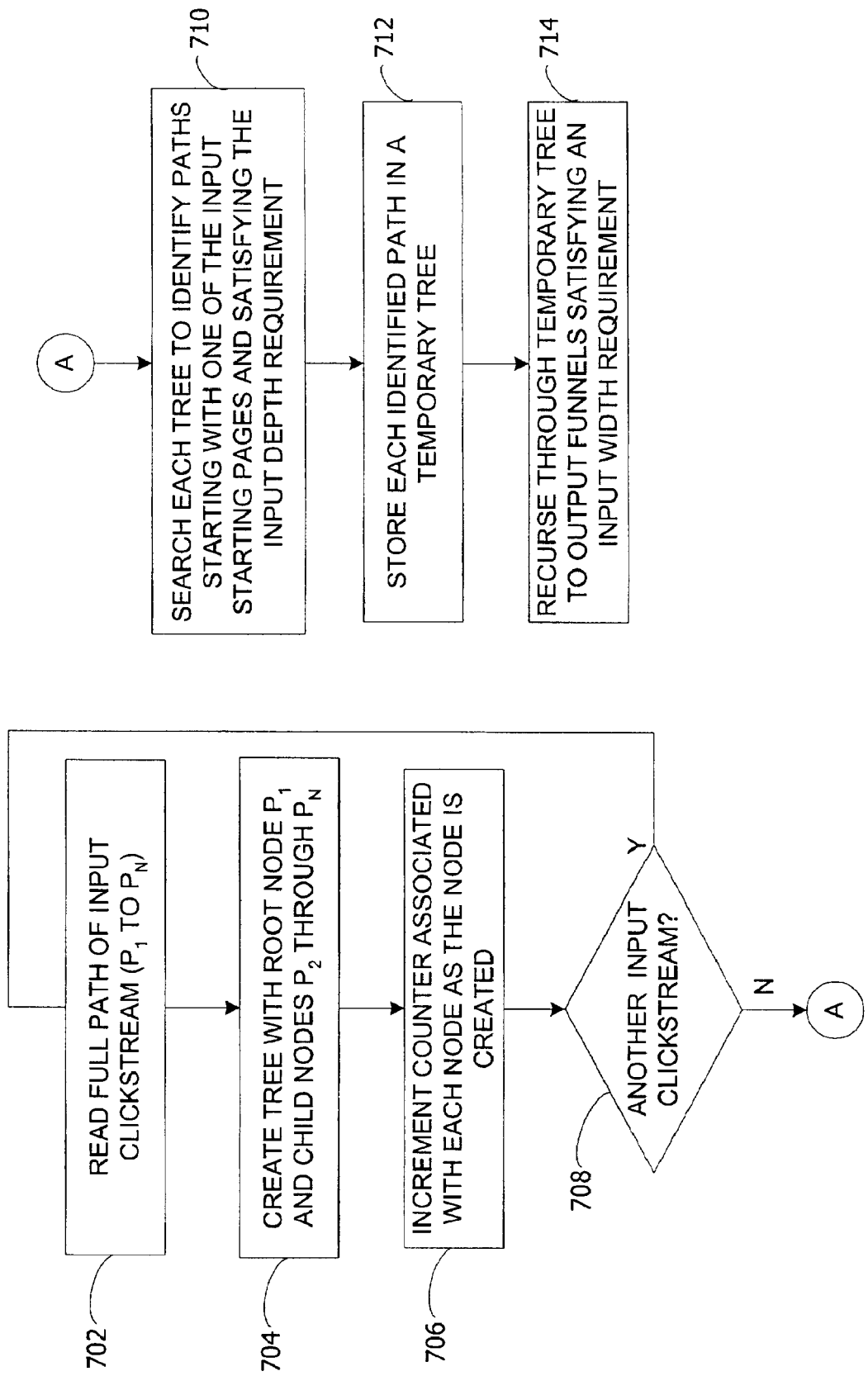
FIG. 7 is an exemplary flow chart illustrating operation of the FPNAV funnel analysis.

FA-SPNAV creates one tree for each possible starting point and stores each X-item subpath of every clickstream record. An alternate method, called FA-FPNAV for Full Path NAVigation trees, creates one tree for each actual starting point of a clickstream record and stores only the full path of each clickstream record. For example, referring to FIG. 7, for clickstream $CS_1$ with pages $\{P_1, P_2 \ldots, P_N\}$ the invention reads $CS_1$ at 702 and creates at 704 the tree rooted at $P_1$, stores its descendant nodes $P_2 \ldots P_N$ as one branch in the tree, and increments the respective counters at 706. Unlike FA-SPNAV where the invention would then create a tree rooted at $P_2$, the invention instead determines if another clickstream record exists at 708, and proceeds to the next clickstream record $CS_2$ and creates a tree whose root node contains the first page of $CS_2$, repeating steps 702, 704, 706, and 708. The invention subsequently stores the full clickpath Of $CS_2$ as a full branch of the tree. With FA-FPNAV, the invention is not creating extraneous nodes and trees for each possible subpath of a clickstream record. The invention only stores the full record itself; therefore, the number of nodes required to hold all the necessary information is less than what FA-SPNAV would need if there were no starting point or depth criteria.

After the invention has created all the trees, the invention then enters phase two where, for each possible starting page, the invention searches through all trees at 710 looking for subpaths that start at the given starting page and satisfy the depth requirement. As the invention finds these subpaths, the invention stores them at 712 in a temporary tree that will hold the support for all funnels beginning with the particular starting point in question. After the invention has finished searching through all the trees, the invention then recurses through the temporary tree at 714 and outputs funnels that satisfy the width criteria.

FA-FPNAV is a particularly useful alternative to FA-SPNAV when the analyst wants to find very long funnels and is interested in funnels starting with any page on the web site. In this case, the amount of nodes created by FA-SPNAV will be more than FA-FPNAV because FA-SPNAV stores several subpaths of each user-session's clickstream record. FA-FPNAV only stores the full subpath of a user-session's clickstream. Although FA-FPNAV stores fewer nodes in the extreme case, it may use more processing time than FA-SPNAV to generate all the funnels. SPNAV is generally used for narrow ranges of funnels.

A computer-readable medium stores a data structure for a particular node in a tree structure. The data structure stores at least one click path from one or more input clickstreams representing an ordered path of successively viewed web pages $P_1$ to $P_N$ of a user. The tree structure has a root node. Each particular node is associated with one of the viewed web pages. The data structure includes a first field storing a page name representing a name of the viewed web page associated with the particular node. The data structure also includes a second field storing a support value representing a frequency of appearance for a particular path starting with the root node of the tree structure and including the particular node. The data structure is created for each distinct web page in the input clickstreams as the clickstream is scanned.

Figure 8:
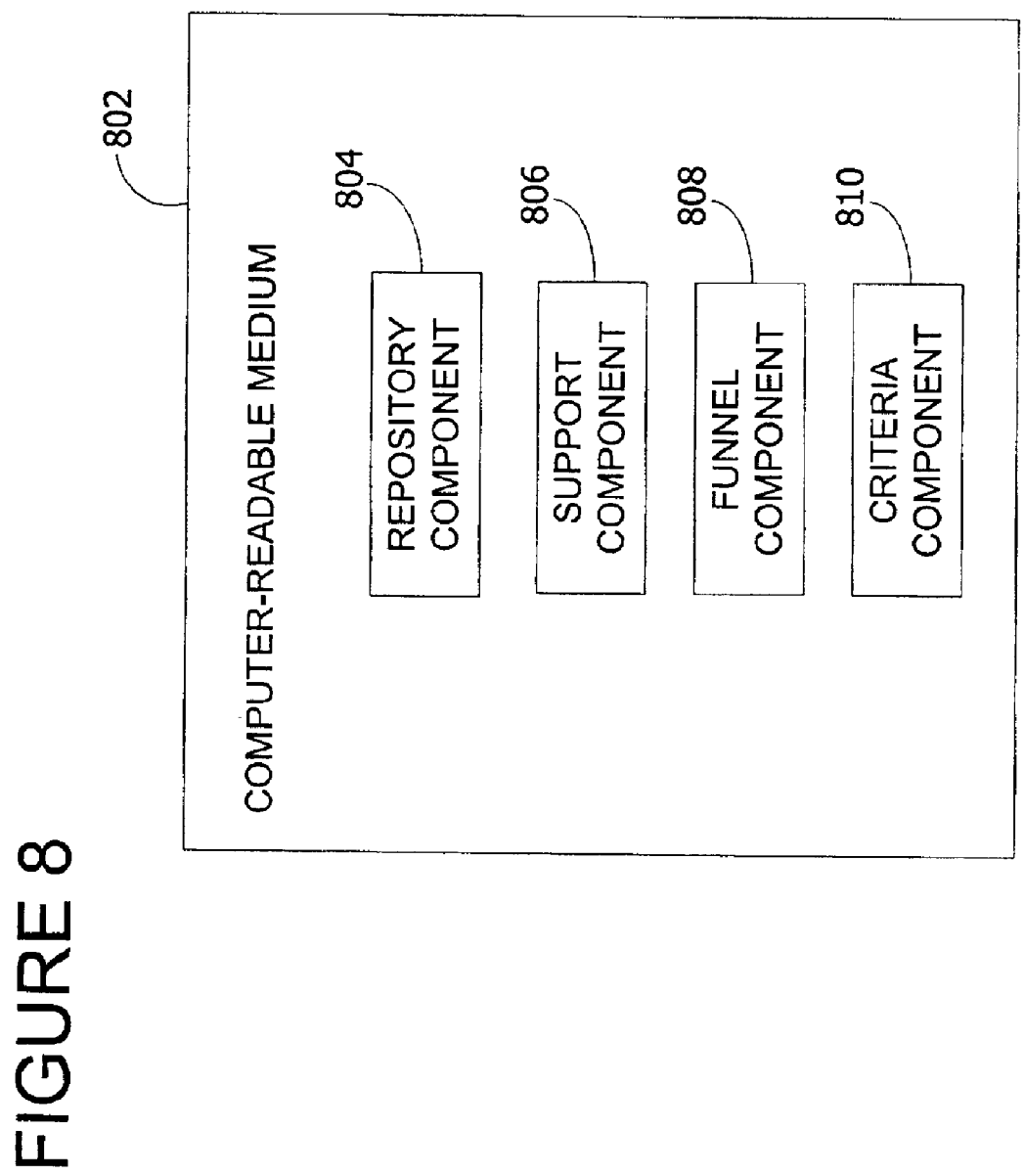
FIG. 8 is a block diagram of one embodiment of the invention illustrating an exemplary computer-readable medium on which the invention may be stored.

Referring first to FIG. 8, a computer-readable medium 802 has computer-executable components for extracting at least one funnel from at least one input clickstream (CS) representing an ordered path of successively viewed pages $P_1$ to $P_N$ of a user. The components include a repository component 804, a support component 806, a funnel component 808, and a criteria component 810. The repository component 804 stores each ordered path within the CS in one of up to N tree structures. Each of the tree structures has a root node $P_i$ corresponding to one of pages $P_1$ to $P_N$ and has successive child nodes corresponding to the successive pages after $P_i$ of $P_{i+1}$ to $P_{i+X}$. The value X represents at least one depth criterion specified by the user. The support component 806 increments a counter associated with each node in each ordered path as the ordered path is stored. The funnel component 808 extracts a list of stored paths from each tree structure from the root node $P_i$ to each end node to represent a set of funnels corresponding to the CS. The criteria component 810 analyzes each stored path in each tree structure using the counters to identify the stored paths that satisfy one or more input criteria specified by the user.

Some alternative embodiments are next discussed. A graphical user interface (GUI) visualizes the funnel analysis by, for example, creating trees, updating counters, and extracting funnels. The GUI increases interactivity between an end user and the funnel analysis by allowing the user to input the various criteria via the GUI. In another embodiment, the invention is performed statically by analyzing a stored input clickstream on demand. In another embodiment, the invention is performed dynamically by analyzing a clickpath as the user creates the clickpath.

In one embodiment, a single data file includes all the input clickstreams. Each clickstream includes a globally unique identifier (GUID), time of access, date of access, and target information (pages viewed). Only GUIDs with valid page views and valid page views themselves are considered (e.g., hits with the extension .asp, .htm, .html, .hts and no extension). To perform the analysis, five percent of the GUIDs are randomly selected as the sample set. The data file is sorted by GUID, date and time and fed as input to a Perl script that generates session statistics such as number of hits and average time spent for each GUID. Another script subsequently executes to concatenate clickstreams by GUID before the funnel analysis is run on the final data set.

Based on the sample data set, an exemplary report indicates page view and session statistics: the number of GUIDs in a particular month, the number of page views by the month's GUIDs, the number of sessions for the month's GUIDs, the number of sessions per GUID for the month, and the number of page views per session. For example, there may be 800,000 GUIDs in the month, 13 million page views for all the GUIDs, three million sessions for all the GUIDs, three sessions per GUID, and five page views for session. In addition, interestingness for the funnels in the sample data set may be defined as those funnels that start with any one of the top thirty pages hit most during a particular month. Those skilled in the art will note that the exemplary data files and the exemplary reports are merely exemplary, and that other data files may include different fields and that other reports may derive different statistics than those described herein to achieve a funnel analysis within the scope of the invention.

In addition, those skilled in the art will note that while the embodiments described herein generally relate to web usage data mining, the invention is applicable in other data mining and analysis applications both on- and off-line. For example, the invention may be applied to an input data file detailing on-line and/or off-line product sales for a company. The invention would generate "interesting" funnels to identify any interconnections between the sales of various products. For example, a funnel may indicate that 90% of users who purchase product A also purchase product B. The report may also indicate whether product B is purchased within a specific time frame of the purchase of product A. Such an analysis by the present invention aids a company in tracking customer behavior to allow the company to identify trends and improve sales.

Similarly, the invention may be applied to market research. For example, the input file may include the results of a questionnaire completed by a focus group. The invention analyzes the questionnaire results to identify marketing trends and customer behavior.

Operating Environment

FIG. 9 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data, For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 9 illustrates operating system 144, application programs 146, other program modules 148, and program data 150.

The computer 130 may also include other removable/non-removable, volatile/nonvolatile computer storage media. For example, FIG. 9 illustrates a hard disk drive 154 that reads from or writes to non-removable, nonvolatile magnetic media. FIG. 9 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 9, provide storage of computer readable instructions, data structures, program modules and other data for the computer 130. In FIG. 9, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 9 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 9 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Appendix A

Application of SPNAV on Exemplary Network Clickstream Data

The SPNAV implementation described herein yields interesting funnels. SPNAV was run on a particular nonrandom group of 332,970 users who came to a network of sites on Thursday, Jan. 18, 2001. The users' day's sessionized clickstream data was extracted at the domain level. In total, there were 1,019,341 sessions and 9,512,431 page views in the final data set. On average, there were 9.3 page views per session. The following table displays some sample clickstreams. The Pages in the following table (e.g., Page A) represent files such as index.html on a computer-readable medium accessible by the user.

TABLE 1

Sample User-Session Clickstreams

Page A, Page A, Page A, Page A
Page B, Page B, Page C, Page C
Page D, Page B, Page B
Page B, Page E, Page E
Page B, Page B
Page B, Page B, Page F, Page F, Page B, Page B
Page G, Page G, Page H The clickstream data file consisted of the 1,019,341 clickstreams for each of the user sessions in the day. It was 23 MB in size after decoding the raw domain names to domain IDs. SPNAV was implemented in Perl and run on this clickstream file using a machine with a 550 MHz Intel processor and four gigabytes of memory. There were twenty test cases containing different width, depth, and starting page criteria. Table 2 shows the different criteria used in each case, the performance of the analysis with each criterion and the number of nodes created (LL in the Width Crit. Column stands for "Last Level", L2 in the Width Crit. Column stands for "Level 2", etc.).

TABLE 2

Criteria, Run Time and Nodes Created

| Case No. | Depth Crit. | Width Crit. | Start Page Crit. (# of pages) | Run Time (in sec) | # of Nodes Created |
|---|---|---|---|---|---|
| 1 | <=3 | LL <= 100% | 0 | 540 | 56293 |
| 2 | <=4 | LL <= 100% | 0 | 650 | 199612 |
| 3 | <=4 | LL <= 100% | 5 | 221 | 36427 |
| 4 | <=5 | LL <= 100% | 0 | 946 | 483861 |
| 5 | <=4 | LL <= 80% | 0 | 667 | 199612 |
| 6 | <=4 | LL <= 60% | 0 | 650 | 199612 |
| 7 | <=4 | LL <= 40% | 0 | 685 | 199612 |
| 8 | <=4 | LL <= 20% | 0 | 682 | 199612 |
| 9 | <=4 | LL <= 10% | 0 | 680 | 199612 |
| 10 | <=4 | LL >= 10% | 0 | 604 | 199612 |
| 11 | <=4 | LL >= 20% | 0 | 601 | 199612 |
| 12 | <=4 | LL >= 40% | 0 | 604 | 199612 |
| 13 | <=4 | LL >= 60% | 0 | 599 | 199612 |
| 14 | <=4 | LL >= 80% | 0 | 593 | 199612 |
| 15 | [2,4] | LL <= 50% | 0 | 612 | 199612 |
| 16 | [2,4] | LL <= 50% | 20 | 501 | 103377 |
| 17 | [2,4] | LL <= 50% | 10 | 444 | 68883 |
| 18 | [2,4] | LL <= 50% | 5 | 225 | 36427 |
| 19 | [2,4] | L2 >= 80% L3 <= 50% L4 <= 20% | 5 | 270 | 36427 |
| 20 | [2,4] | L2 <= 70% L3 >= 40% L4 >= 30% | 5 | 216 | 36427 |

The results above show that depth and starting page criteria have the greatest effect on the number of nodes created and the amount of time required for the program to complete. For example, in case no. 2, the funnels of interest are those funnels with depth less than or equal to 4. This run took 650 seconds to complete and occupied 199,612 nodes. Decreasing the depth to less than or equal to 3 (case no. 1), the run took only 540 seconds to finish and occupied 56,293 nodes (26% of nodes occupied with depth of 4 or less). The effect of limiting the starting pages is even more dramatic. Supplying a depth criteria of 4 or less and applying starting page criteria of five pages (case no. 3), the analysis took 221 seconds to complete and occupied only 36,247 nodes. Here appears quite a substantial improvement when starting page and depth criteria are applied. An exact measure of improvement depends on the quality of the data set, the number of pages in the clickstream and the number of unique click paths found. Experimenting with width criteria, the results demonstrated that width did not have much of an effect on processing time. Some interesting funnels found using SPNAV on the data set were:

TABLE 3

Interesting Funnels

| Funnel Point 1 | Funnel Point 2 | Funnel Point 3 | Funnel Point 4 | Funnel % |
|---|---|---|---|---|
| Page E | Abandon | — | — | 100, 9.3, —, — |
| Page C | Page E | — | — | 100, 3.0, —, — |
| Page D | Page B | — | — | 100, 50.6, —, — |
| Page C | Page B | — | — | 100, 29.3, —, — |
| Page A | Page B | Abandon | — | 100, 18.2, 1.5, — |
| Page D | Page B | Page B | — | 100, 50.6, 38.2, — |
| Page C | Page B | Page B | — | 100, 29.3, 17.1, — |
| Page C | Page B | Page E | — | 100, 29.3, 2.0, — |
| Page C | Page B | Page I | — | 100, 29.3, 1.3, — |
| Page E | Page B | Page E | — | 100, 22, 2.8, — |
| Page A | Page B | Page A | — | 100, 18.2, 3.5, — |
| Page J | Page B | Page E | — | 100, 6.9, 0.4, — |
| Page C | Page B | Page I | Page B | 100, 29.3, 1, 3, |
| Page E | Page B | Page E | Page B | 100, 22, 2.8, 1.4 |

The first record in the table represents a two level funnel revealing that 9.3% of all hits to Page E were followed by no other hits. The second record in the table represents a two level funnel showing that 3% of hits on Page C in the day were followed by a hit on Page E next. The second three level funnel (record six) indicates that of all hits to Page D, 51% of them were followed by hits to Page B and 38% were subsequently followed by another hit to Page B. The first four level funnel (record thirteen) reveals that of all page views on Page C, 29% of them were trailed by a hit to Page B, 1.3% were then followed by a visit to Page I and finally 0.55% returned to Page B.

These are extremely interesting findings from a business point of view. The first record indicates that after this group of users hit Page E, over 9% of the time they abandoned the network in their current session. For the funnels starting with hits on Page D, it appears that 51% of the succeeding hits did not stay inside the site; rather, they went to Page B. These are indications that for this particular group of users, Page E and Page D sites could restructure some pages in order to achieve greater user "stickiness." Similarly, 29% of hits on Page C revert back to Page B immediately afterwards.

What is claimed is:

1. A computer-implemented method for extracting at least one web usage analysis funnel from at least one input clickstream (CS) for analyzing user interactions with a web site, said computer-implemented method comprising:

identifying an ordered path of web pages $P_1$ to $P_N$ as the web pages are successively viewed by a user, said identified ordered path constituting a CS;

storing each ordered path within the CS in one of up to N tree structures, each of said tree structures having a root node $P_i$ corresponding to one of pages $P_1$ to $p_N$ and having successive child nodes corresponding to the successive pages after $P_i$ of $P_{i+1}$ to $P_{i+x}$, said X representing a specified depth criterion; and extracting a list of stored paths from each of the tree structures, each of the stored paths in the extracted list representing the web pages successively viewed by users from the root node $P_i$ to each end node $P_{i+x}$ as a function of the specified depth criterion.

2. The computer-implemented method of claim 1, wherein storing comprises incrementing a counter associated with each node in each ordered path as the ordered path is stored, and further comprising analyzing each stored path in each tree structure using the counters to identify the stored paths that satisfy one or more input criteria.

3. The computer-implemented method of claim 2, wherein the input criteria is selected from a group consisting of a width criterion for the child nodes, a starting page criterion, and an end page criterion, said width criterion representing a retention rate, said starting page criterion specifying a set of pages in CS from which $P_i$ is selected, and said end page criterion specifying a set of pages in CS that can serve as end nodes in each of the tree structures.

4. The computer-implemented method of claim 3, wherein the retention rate is a function of a frequency relative to one of the following: the root node or the previous child node.

5. The computer-implemented method of claim 3, wherein the retention rate is a function of an absolute frequency.

6. The computer-implemented method of claim 3, wherein the width criterion specifies one or more of the following: a minimum width and a maximum width.

7. The computer-implemented method of claim 1, wherein the depth criterion specifies a maximum depth.

8. The computer-implemented method of claim 1, wherein the depth criterion represents a desired number of pages in each stored path.

9. The computer-implemented method of claim 1, wherein $P_i$ corresponds to one of $P_1$ to $P_N$ specified as starting page criterion.

10. The computer-implemented method of claim 1, wherein the stored path is a subpath.

11. The computer-implemented method of claim 1, wherein storing comprises scanning the CS one time.

12. The computer-implemented method of claim 1, further comprising automatically generating a report of the extracted list of stored paths.

13. The computer-implemented method of claim 1, wherein one or more computer-readable media have computer-executable instructions for performing the computer-implemented method recited in claim 1.

14. A computer-implemented method for analysis of web usage analysis funnels in at least one input clickstream (CS) for analyzing user interactions with a web site, said computer-implemented method comprising:

identifying an ordered path of web pages as the web pages are successively viewed by a user, said identified ordered path constituting a CS;

storing one or more paths within the CS satisfying a first input criterion in one or more tree structures; and analyzing each of the tree structures to identify any of the paths that satisfy a second input criterion, said second input criterion representing a width criterion.

15. The computer-implemented method of claim 14, wherein the first input criterion comprises one or more of the following: a depth criterion specifying a maximum number of pages in each stored path and a starting page criterion specifying a set of pages in the CS that can serve as a root node in one of the tree structures.

16. The computer-implemented method of claim 14, wherein the stored path is a subpath.

17. The computer-implemented method of claim 14, wherein storing comprises:

creating a tree structure for each starting page of the one or more paths; and creating one or more branches in each of the tree structures for each path that starts with one of the starting pages.

18. The computer-implemented method of claim 14, wherein one or more computer-readable media have computer-executable instructions for performing the computer-implemented method recited in claim 14.

19. A computer-implemented method for extracting at least one web usage analysis funnel from one or more input clickstreams for analyzing user interactions with a web site, said computer-implemented method comprising:

identifying an ordered path of web pages as the web pages are successively viewed by a user, said identified ordered path constituting one of the input clickstreams;

creating a tree structure for storing the identified ordered path for each of the clickstreams, each tree structure having a root node corresponding to the first page of the clickstream and having a child node corresponding to each of the successive pages in the clickstream;

for each input starting page, searching each tree structure to identify any stored path that starts at a node associated with the input starting page and satisfies an input depth requirement, said input depth requirement representing a desired number of pages in each path;

storing each identified path in a temporary tree; and recursing through the temporary tree to identify any path that satisfies an input width requirement, said input width requirement representing a retention rate.

20. The computer-implemented method of claim 19, wherein the identified path is a subpath.

21. The computer-implemented method of claim 19, wherein the recursed path is a subpath.

22. The computer-implemented method of claim 19, wherein storing comprises incrementing a counter associated with each node in each path as the path is stored.

23. The computer-implemented method of claim 19, wherein one or more computer-readable media have computer-executable instructions for performing the computer-implemented method recited in claim 19.

24. A computer-readable medium having computer-executable components for extracting at least one web usage analysis funnel from at least one input clickstream (CS) for analyzing user interactions with a web site, said components comprising:

an identification component for identifying an ordered path of web pages $P_1$ to $P_N$ as the web pages are successively viewed by a user, said identified ordered path constituting a CS;

a repository component for storing each ordered path within the CS in one or more tree structures up to N tree structures, each of said tree structures having a root node $P_i$ corresponding to one of pages $P_1$ to $P_N$ and having successive child nodes corresponding to the successive pages after $P_i$ of $P_{i+1}$ to $P_{i+x}$, said X representing a specified depth criterion;

a support component for incrementing a counter associated with each node in each ordered path as the ordered path is stored;

a funnel component for extracting a list of stored paths from each of the tree structures, each of the stored paths in the extracted list representing the web pages successively viewed by users from the root node $P_i$ to each end node $P_{i+x}$ as a function of the specified depth criterion; and a criteria component for analyzing each stored path in each of the tree structures using the counters to identify the stored paths that satisfy one or more input criteria.

25. The computer-readable medium of claim 24, wherein the input criteria is selected from a group consisting of a width criterion, a starting page criterion, and an end page criterion, said width criterion represents a retention rate, said starting page criterion specifies a set of pages in CS from which $P_i$ is selected, and said end page criterion specifies a set of pages in CS that can serve as end nodes in each of the tree structures.

26. A computer-readable medium having stored thereon a data structure for a particular node in a tree structure storing at least one click path from one or more input clickstreams representing an ordered path of successively viewed web pages $P_1$ to $P_N$ of a user for analyzing user interactions with a web site, said tree structure having a root node, each particular node associated with one of the viewed web pages, said data structure comprising:
   a first field including data identifying a page name for the viewed web page associated with the particular node; and
   a second field storing a support value representing a frequency of appearance for a particular path including the viewed web page identified in the first field, said particular path starting with the root node of the tree structure and including the particular node.

27. The computer-readable medium of claim 26, wherein the data structure is created for each distinct web page in the input clickstreams as the clickstream is scanned.

28. A computer-implemented method for extracting at least one web usage analysis funnel from at least one input clickstream (CS) for analyzing user interactions with a web site, said computer-implemented method comprising:
   identifying an ordered path of web pages $P_1$ to $P_N$ as the web pages are successively viewed by a user, said identified ordered path constituting a CS;
   reading through CS from $P_1$ to $P_x$, wherein X is less than or equal to N and represents an input depth;
   creating a first tree with a root node associated with page $P_1$, and with successive child nodes associated with pages $P_2$ to $P_x$, wherein $P_x$ represents a child node with parent $P_{x-i}$;
   incrementing a counter associated with each node in the first tree as the node is created;
   creating a second tree with a root node associated with page $P_2$, and with successive child nodes associated with pages $P_3$ to $P_{x+i}$;
   incrementing a counter associated with each node in the second tree as the node is created;
   creating additional trees rooted at each page $P_{N-x+2}$ to $P_N$ for all subpaths in CS starting with pages $P_{N-x+2}$;
   storing the subpaths that start at each page and ending at $P_N$ in the respective tree so that new trees are created only when the trees or nodes have not already been created; and
   running through all paths in each tree to extract and output only paths that satisfy input depth and input width criteria.

29. The computer-implemented method of claim 28, further comprising processing another clickstream according to the computer-implemented method described in claim 28.

30. The computer-implemented method of claim 28, wherein the tree for a page $P_i$ is only created if $P_i$ is part of an input starting page criterion.

31. The computer-implemented method of claim 28, wherein one or more computer readable media have computer-executable instructions for performing the computer-implemented method recited in claim 28.

* * * * *

UNITED STATES PATENT AND TRADEMARK OFFICE
CERTIFICATE OF CORRECTION

PATENT NO. : 7,020,643 B2  Page 1 of 1
APPLICATION NO. : 10/056766
DATED : March 28, 2006
INVENTOR(S) : Mah et al.

It is certified that error appears in the above-identified patent and that said Letters Patent is hereby corrected as shown below:

On the title page, in "Primary Examiner", in column 2, line 1, delete "Hiri" and insert -- Hirl --, therefor.

On page 2, item (56), under "Other Publications", in column 2, line 9, after "Aug. 2000," delete "Aug. 2000,".

In column 6, line 57, delete "specifics" and insert -- specifies --, therefor.

In column 9, line 59, delete "$P_N$as" and insert -- $P_N$ as --, therefor.

In column 9, line 67, delete "Of" and insert -- of --, therefor.

In column 12, line 20, delete "data," and insert -- data. --, therefor.

In column 16, line 66, in Claim 1, delete "$p_N$" and insert -- $\mathbf{P_N}$ --, therefor.

In column 20, line 7, in Claim 28, delete "$P_{x-i}$;" and insert -- $P_{x-1}$; --, therefor.

In column 20, line 12, in Claim 28, delete "$P_{x+i}$;" and insert -- $P_{x+1}$; --, therefor.

In column 20, line 17, in Claim 28, delete "$P_{N-x+2}$ ;" and insert -- $P_{N-x+2}$ to $P_N$; --, therefor.

Signed and Sealed this

Sixth Day of April, 2010

David J. Kappos
*Director of the United States Patent and Trademark Office*